US010109127B2

(12) United States Patent
Park (10) Patent No.: US 10,109,127 B2
(45) Date of Patent: Oct. 23, 2018

(54) DEVICE FOR GRANTING PERMISSION TO CONTROL VEHICLE AND METHOD OF DRIVING THE SAME

(71) Applicant: Kia Motors Corporation, Seoul (KR)

(72) Inventor: Se Min Park, Seoul (KR)

(73) Assignee: Kia Motors Corporation, Seoul (KR)

( * ) Notice: Subject to any disclaimer, the term of this patent is extended or adjusted under 35 U.S.C. 154(b) by 52 days.

(21) Appl. No.: 15/383,007

(22) Filed: Dec. 19, 2016

(65) Prior Publication Data

US 2018/0082504 A1  Mar. 22, 2018

(30) Foreign Application Priority Data

Sep. 21, 2016 (KR) ........................ 10-2016-0120547

(51) Int. Cl.
*G07C 9/00* (2006.01)
*H04L 29/06* (2006.01)
*B60W 50/10* (2012.01)
*G06Q 50/30* (2012.01)

(52) U.S. Cl.
CPC ......... *G07C 9/00571* (2013.01); *B60W 50/10* (2013.01); *G06Q 50/30* (2013.01); *G07C 9/00182* (2013.01); *H04L 63/08* (2013.01); *G07C 2009/00769* (2013.01)

(58) Field of Classification Search
CPC ............ G07C 9/00571; G07C 9/00182; G07C 2009/00769; B60W 50/10; G06Q 50/30; H04L 63/08
USPC ........................................................... 701/36
See application file for complete search history.

(56) References Cited

U.S. PATENT DOCUMENTS

| 8,613,052 | B2* | 12/2013 | Weiss | H04L 63/0846 726/4 |
| 8,639,214 | B1* | 1/2014 | Fujisaki | G06Q 20/32 379/88.03 |
| 2008/0215202 | A1* | 9/2008 | Breed | G01C 21/3611 701/25 |
| 2014/0096217 | A1* | 4/2014 | Lehmann | H04L 63/08 726/7 |
| 2014/0172727 | A1* | 6/2014 | Abhyanker | G06Q 50/30 705/307 |
| 2014/0195283 | A1* | 7/2014 | Stefik | G06Q 10/02 705/5 |
| 2015/0033305 | A1* | 1/2015 | Shear | G06F 21/45 726/6 |
| 2015/0116100 | A1* | 4/2015 | Yang | G07C 9/00119 340/426.19 |

(Continued)

FOREIGN PATENT DOCUMENTS

JP  2004-299587 A  10/2004

*Primary Examiner* — Atul Trivedi
(74) *Attorney, Agent, or Firm* — Mintz Levin Cohn Ferris Glovsky and Popeo, P.C.; Peter F. Corless (57) ABSTRACT

A device for granting permission to control a vehicle includes: a communication unit; and a controller transmitting a request through the communication unit to a telematics (TM) center to provide a specific service related to the vehicle and sharing information about a location of the vehicle with a specific service provider that provides the specific service. Upon receiving a request for permission to control the vehicle from the specific service provider, the controller grants permission to control the vehicle to the specific service provider in exchange for providing the specific service.

18 Claims, 8 Drawing Sheets

(56) References Cited

U.S. PATENT DOCUMENTS

| | | | |
|---|---|---|---|
| 2015/0363986 A1* | 12/2015 | Hoyos | G07C 9/00563 340/5.61 |
| 2016/0027307 A1* | 1/2016 | Abhyanker | G08G 1/005 701/117 |
| 2016/0054140 A1* | 2/2016 | Breed | H04W 4/02 701/408 |
| 2017/0374047 A1* | 12/2017 | Fujiwara | G07C 9/00309 |

* cited by examiner

| | Opening/ closing of doors | Opening/ closing of trunk | Start and driving | Current location sharing | Personal setting | Location/ time control |
|---|---|---|---|---|---|---|
| Home-to-home repair/fueling/ valet parking | o | x | o | o | x | o |
| Wash/regular checkup (maintenance) | o | x | x | o | x | o |
| Package receipt | x | o | x | o | x | o |
| Car sharing/ sharing between family members | o | o | o | o | o | o |

DEVICE FOR GRANTING PERMISSION TO CONTROL VEHICLE AND METHOD OF DRIVING THE SAME

CROSS-REFERENCE TO RELATED APPLICATION

This application claims the benefit of and priority to Korean Patent Application No. 10-2016-0120547, filed on Sep. 21, 2016, which is hereby incorporated by reference in its entirety as if fully set forth herein.

BACKGROUND OF THE DISCLOSURE

Technical Field

Embodiments of the present disclosure generally relate to vehicular control technology, and more particularly, to a device for granting permission to control a vehicle and a method of driving the same.

Discussion of the Related Art

Generally, permission to control a vehicle is given only to a person with a vehicle key. However, it can be inconvenient or difficult for the person with a vehicle key to control the vehicle. Therefore, research has been conducted to develop efficient vehicle control techniques in consideration of user convenience.

SUMMARY OF THE DISCLOSURE

The present disclosure is directed to a device for granting permission to control a vehicle and a method of driving the same that substantially obviate one or more problems due to limitations and disadvantages of the related art.

An object of the present disclosure is to provide a device for differently setting vehicle control permission according to a service type and a service provider.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the embodiments particularly pointed out in the written description and claims hereof, as well as the appended drawings.

In accordance with embodiments of the present disclosure, a device for granting permission to control a vehicle includes: a communication unit; and a controller transmitting a request through the communication unit to a telematics (TM) center to provide a specific service related to the vehicle and sharing information about a location of the vehicle with a specific service provider that provides the specific service. Upon receiving a request for permission to control the vehicle from the specific service provider, the controller grants permission to control the vehicle to the specific service provider in exchange for providing the specific service.

Furthermore, in accordance with embodiments of the present disclosure, a method of controlling a device for granting permission to control a vehicle includes: transmitting, by a controller, a request through a communication unit to a telematics (TM) center to provide a specific service related to the vehicle; sharing, by the controller, information about a location of the vehicle with a specific service provider that provides the specific service; and upon receiving a request for permission to control the vehicle from the specific service provider, granting, by the controller, permission to control the vehicle to the specific service provider in exchange for providing the specific service.

Furthermore, in accordance with embodiments of the present disclosure, a service-providing device includes: a device communication unit; and a device controller receiving a request through the device communication unit from a permission-granting device to provide a specific service related to a vehicle and providing the specific service to the vehicle in response to the received request. The device controller receives information about a location of the vehicle through the device communication unit from the permission-granting device.

Furthermore, in accordance with embodiments of the present disclosure, a control system installed in a vehicle includes: a vehicle communication module communicating with at least one of a telematics (TM) center, a permission-granting device, and an authentication center; and a vehicle controller performing control such that, upon input of a vehicle control command from the authentication center, an operation corresponding to the vehicle control command is performed for performing a specific service related to the vehicle.

It is to be understood that both the foregoing general description and the following detailed description of the present disclosure are exemplary and explanatory and are intended to provide further explanation of the embodiments as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

Reference will now be made in detail to the embodiments of the present disclosure, examples of which are illustrated in the accompanying drawings. Wherever possible, the same reference numbers will be used throughout the drawings to refer to the same or like parts. As those skilled in the art would realize, the described embodiments may be modified in various different ways, all without departing from the spirit or scope of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Hereinafter, devices, systems, and methods to which embodiments of the present disclosure are applied will be described in detailed with reference to the attached drawings.

Figure 1:
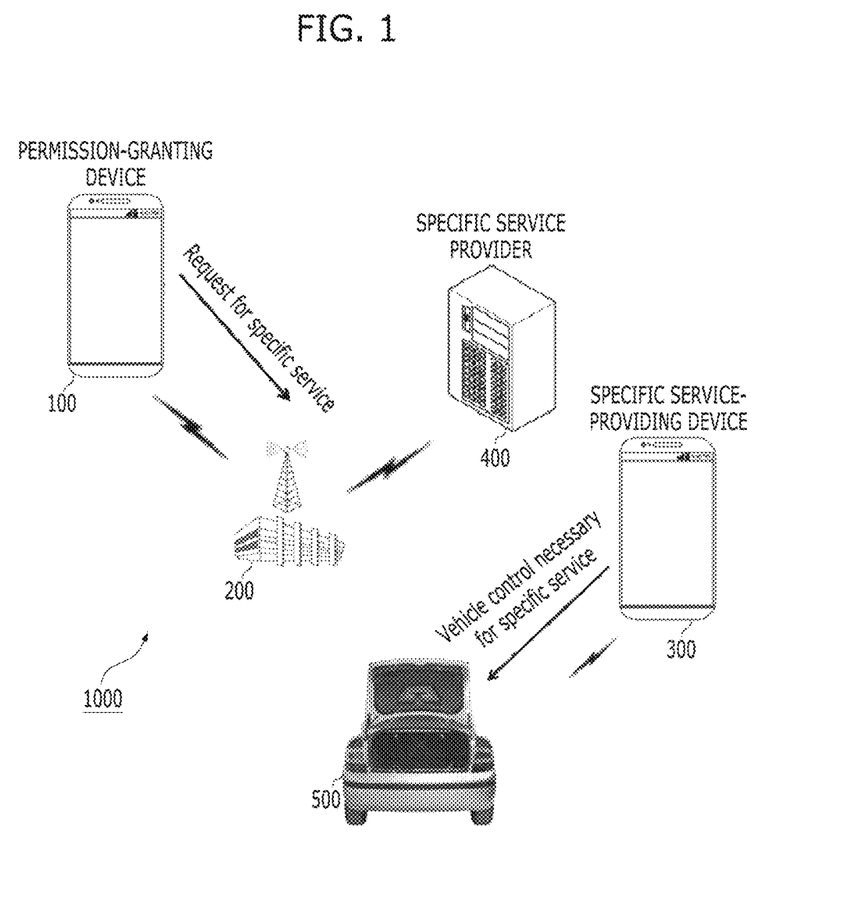
FIG. 1 schematically illustrates a service system for performing vehicle control to provide a vehicle related service according to embodiments of the present disclosure.

FIG. 1 schematically illustrates a service system 1000 for performing vehicle control to provide a vehicle related service according to embodiments of the present disclosure.

A permission-granting device 100 may request that a telematics (TM) center 200 provide a specific service related to a vehicle 500. For example, the permission-granting device 100 may request that the TM center 200 provide a specific service for keeping a package to be received by the owner of the permission-granting device 100 in the vehicle 500. That is, if it is difficult for a user, who is the owner of the permission-granting device 100 and simultaneously the owner of the vehicle 500, to directly receive a package, the permission-granting device 100 may request that the TM center 200 provide a service for keeping the package in the vehicle 500.

The TM center 200 requests that a specific service provider 400, for example, a delivery company, keep the package in the vehicle 500. After a delivery person who belongs to the specific service provider 400 arrives at the vehicle 500, the delivery person may request that the TM center 200 (or an authentication center) open the trunk of the vehicle 500. Upon receiving a request to open the trunk of the vehicle 500 from the TM center 200, the permission-granting device 100 may grant permission to open the trunk of the vehicle 500 to the TM center 200.

Figure 2:
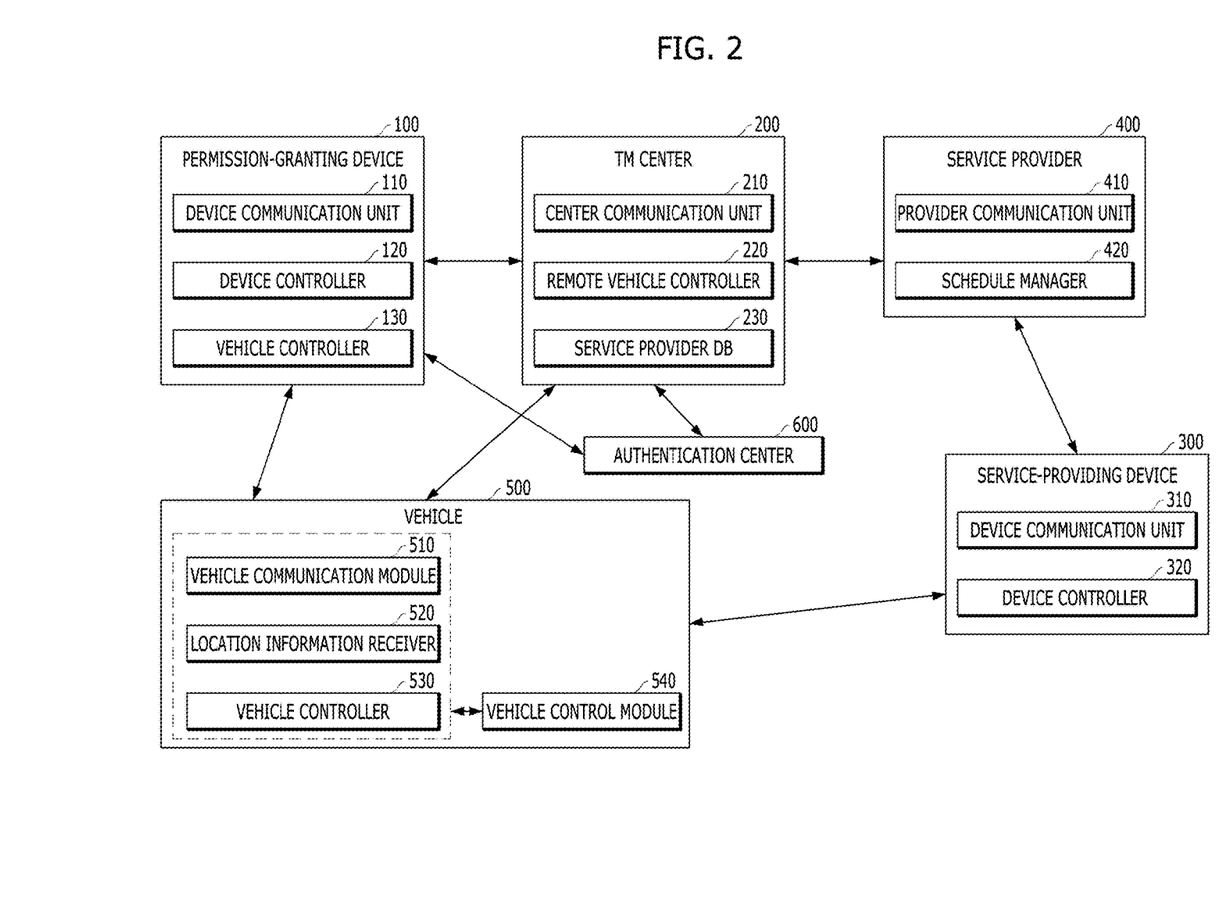
FIG. 2 is a block diagram illustrating detailed elements of a service system according to embodiments of the present disclosure.

FIG. 2 is a block diagram illustrating detailed elements of a service system according to embodiments of the present disclosure.

A permission-granting device 100 may control a vehicle 500. The permission-granting device 100 may control the vehicle 500 through a vehicle communication module 510 included in the vehicle 500. The permission-granting device 100 may control the vehicle 500 so as to perform, for example, door control, tailgate control, remote start, remote air conditioning, and/or remote parking of the vehicle 500. The permission-granting device 100 may control the vehicle 500 even without the key of the vehicle 500.

In this case, the permission-granting device 100 may directly control the vehicle 500 or may cause a smart key (not shown) to control the vehicle 500 through communication with the smart key. However, an embodiment is not limited thereto.

The permission-granting device 100 may be driven by a rightful user thereof. Since the user should be a person who is capable of lawfully using the permission-granting device 100, an authentication procedure may be additionally demanded in order for the permission-granting device 100 to control the vehicle 500.

The permission-granting device 100 may grant a specific device permission to control the vehicle 500. For example, the permission-granting device 100 may grant a specific device permission to control the vehicle 500 for the purpose of services such as, for example, car wash, refueling, valet parking, receipt of a package, car sharing, maintenance, and designated driving.

In particular, the permission-granting device 100 may differently set a vehicle control permission range according to a service type and a service provider. The above-described permission-granting device 100 may be a mobile terminal and may include a device communication unit 110, a device controller 120, and a vehicle controller 130.

The device communication unit 110 includes a module for mobile communication and may receive a general mobile communication service. The device communication unit 110 may communicate with a TM center 200, an authentication center 600, the vehicle 500, a service provider 400, or a service-providing device 300.

The vehicle controller 130 is a module for controlling the vehicle 500 and may remotely control the vehicle 500. For example, the vehicle controller 130 may perform door control, tailgate control, remote start, remote air conditioning, remote parking, or the like, of the vehicle 500.

The device controller 120 is a module for controlling overall operation of the permission-granting device 100 and may request that the TM center 200 provide a vehicle related specific service through the device communication unit 110. In this case, although the device controller 120 may directly request that the service provider 400 provide the vehicle related specific service, the device controller 120 may request that the TM center 200 provide the specific service in order to stably receive the service.

The TM center 200 may communicate with the permission-granting device 100 and, when necessary, control the vehicle 500 at the request of the permission-granting device 100. The TM center 200 may include a center communication unit 210, a remote vehicle controller 220, and a service provider database (DB).

The center communication unit 210 is a module necessary for communication with the permission-granting device 100, the service provider 400, the service-providing device 300, and the vehicle 500.

The remote vehicle controller 220 is a module for controlling the vehicle 500 at the request of the permission-granting device 100.

The service provider DB 230 is a DB in which information about a service provider is stored and stores information about a service provider capable of providing a specific service upon receiving a request for the specific service from the remote vehicle controller 220.

Information about at least one service provider may be registered in the TM center 200 by the service provider 400. In addition, the TM center 400 may manage the service provider 400. For example, the TM center 200 may receive a service quality score, a customer response score, etc. of the service provider 400 from various routes (e.g., a permission-granting device, a social network service (SNS), etc.) and when there is a request for a specific service from the permission-granting device 100, the TM center 200 may provide information about the service provider 400 to the permission-granting device 100 based on a distance to the vehicle 500 and the received information about service quality etc.

In addition, according to embodiments of the present disclosure, the TM center 200 may provide only a quality score and review information of the service provider 400 to the permission-granting device 100 so that the permission-granting device 100 selects the specific service provider 400. However, the embodiments of the present disclosure are not limited thereto.

Upon receiving a request for a specific service from the permission-granting device 100, the TM center 200 may request that the service provider 400 capable of performing the specific service transmit information as to whether to accept the service request, information about a time at which the service can be provided, and information about a person who is to perform the service.

The TM center 200 may provide information about a service provider capable of providing a specific service to the permission-granting device 100. In this case, the TM center 200 may provide the information to the permission-granting device 100 through the authentication center 600.

Specifically, the TM center 200 may provide information about a time at which a service can be provided and service confirmation information to the authentication center 600 and the permission-granting device 100 may receive a service through authentication with the authentication center 600. The authentication center 600 may approve a service charge while performing authentication with the permission-granting device 100. In this case, the permission-granting device 100 may select one of at least one service provider.

The permission-granting device 100 may transmit information about the location of the vehicle 500 at which a service is desired to be provided to the TM center 200. The permission-granting device 100 may store the location of the vehicle 500 or receive the information about the location of the vehicle 500 through communication with the vehicle 500. However, the embodiments of the present disclosure are not limited thereto.

Upon receiving a final service request from the permission-granting device 100, the service provider 400 may request that the service-providing device 300 provide a service. The service provider 400 may include a provider communication unit 410 and a schedule manager 420. The schedule manager 420 may manage at least one service-providing device 300 and perform scheduling so that a specific service may be performed at a specific time.

Upon reaching the vehicle 500 in order to perform a specific service at a specific time, the service-providing device 300 may request that the service provider 400, the TM center 200, the authentication center 600, and the permission-granting device 100 grant specific permission corresponding to the specific service. In this case, the service-providing device 300 may request that the authentication center 600 activate a component of the vehicle, such as drive the horn of the vehicle 500 or flicker the lights of the vehicle 500, in order to easily search for the vehicle 500.

If the service-providing device 300 requests that the authentication center 600 grant permission, the authentication center 600 may perform authentication together with the permission-granting device 100 and grant permission corresponding to a specific service to control the vehicle 500 to the service-providing device 300.

The vehicle 500 may include a vehicle communication module 510, a location information receiver 520, a vehicle controller 530, and a vehicle control module 540.

The vehicle communication module 510 is a module needed for communication with the permission-granting device 100, the TM center 200, and the service-providing device 300.

The location information receiver 520 is a module for receiving information about the location of the vehicle 500.

The vehicle controller 530 is a module for controlling the vehicle control module 540 corresponding to a specific service.

The TM center 200 may be configured by a big data server but the embodiments of the present disclosure are not limited thereto.

Meanwhile, the permission-granting device 100 may designate a threshold time and a threshold region range for providing a service and, if a service is performed out of the threshold time and the threshold range, the permission-granting device 100 may automatically and remotely control the vehicle 500. For example, the permission-granting device 100 may stop the vehicle 500 while reducing the speed of the vehicle 500, deactivate start of the vehicle 500, or close the doors of the vehicle 500. In addition, the vehicle 500 may automatically transmit information about the location thereof to the permission-granting device 100 and the TM center 200.

In addition, if a service provision time and range automatically reach the threshold time and range, control of the vehicle 500 may be automatically performed.

Hereinafter, driving of the service system 1000 according to embodiments of the present disclosure will be described.

Figure 3:
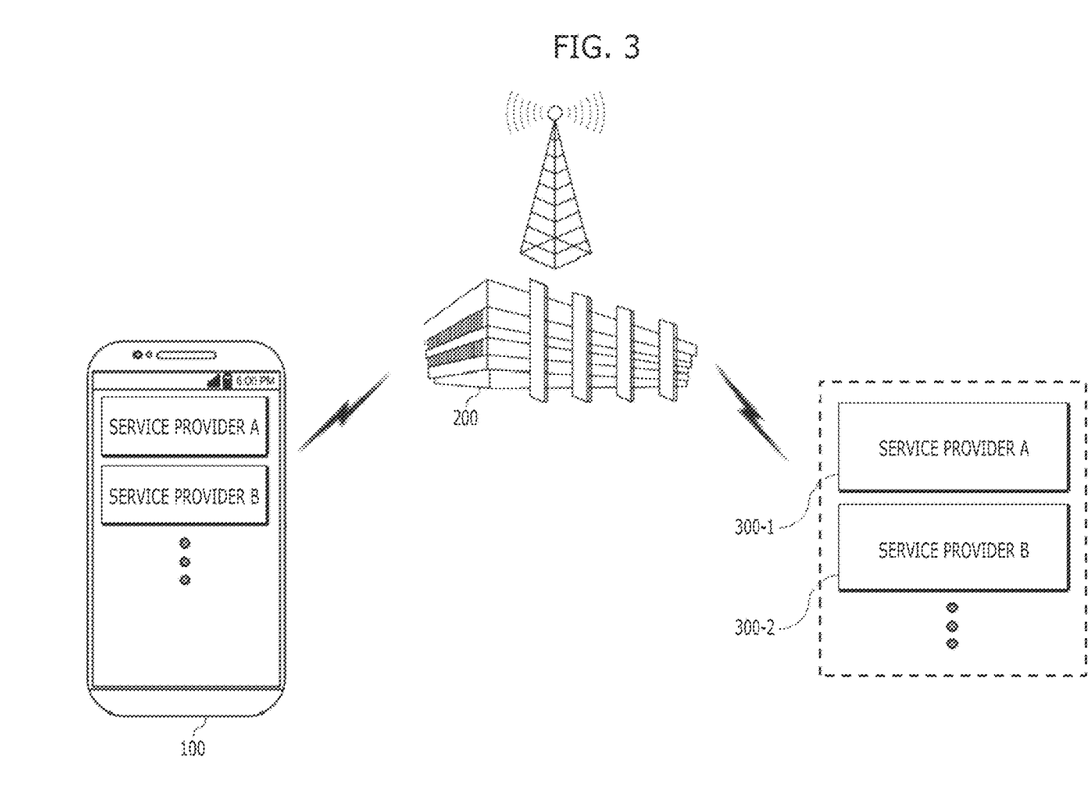
FIG. 3 illustrates a permission-granting device for selecting a service provider.

FIG. 3 illustrates a permission-granting device for selecting a service provider.

A permission-granting device 100 requests that a TM center 200 provide a specific service. Then, the TM center 200 may provide information about registered service providers 300-1, 300-2, . . . to the permission-granting device 100.

In this case, the permission-granting device 100 may receive information about a time at which a service can be provided and information about a service provider from the service providers 300-1, 300-2, . . . .

Figure 4:
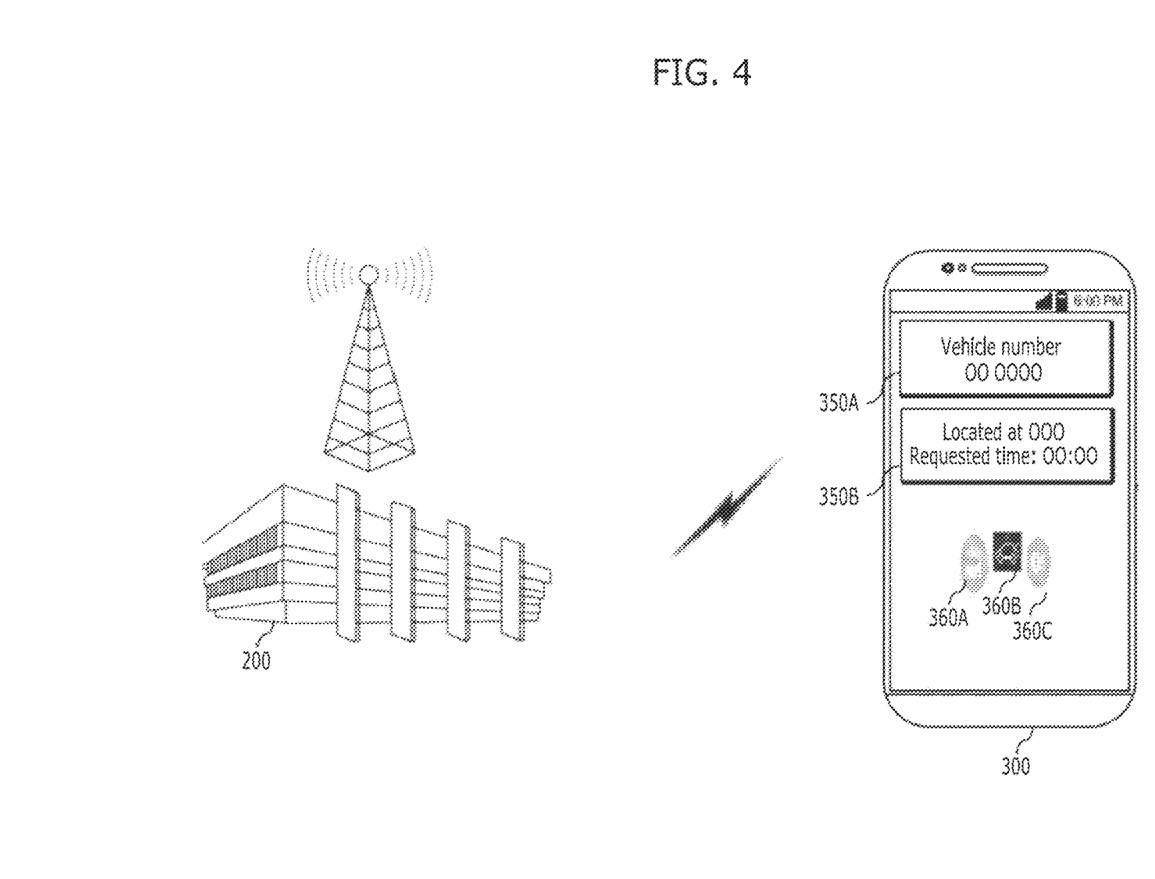
FIG. 4 illustrates the state in which a service-providing device has received information about a vehicle from a TM center.

FIG. 4 illustrates the state in which a service-providing device 300 has received information about a vehicle from a TM center 200.

The service-providing device 300 may receive a vehicle number, information about the location of the vehicle, and information about a service request time and may further receive additional information to easily search for the vehicle.

The service-providing device 300 may further include a user interface for requesting that the TM center 200 ring a horn 360A of the vehicle, open a trunk 360B or flicker lights 360C of the vehicle in order to easily search for the vehicle.

Figure 5:
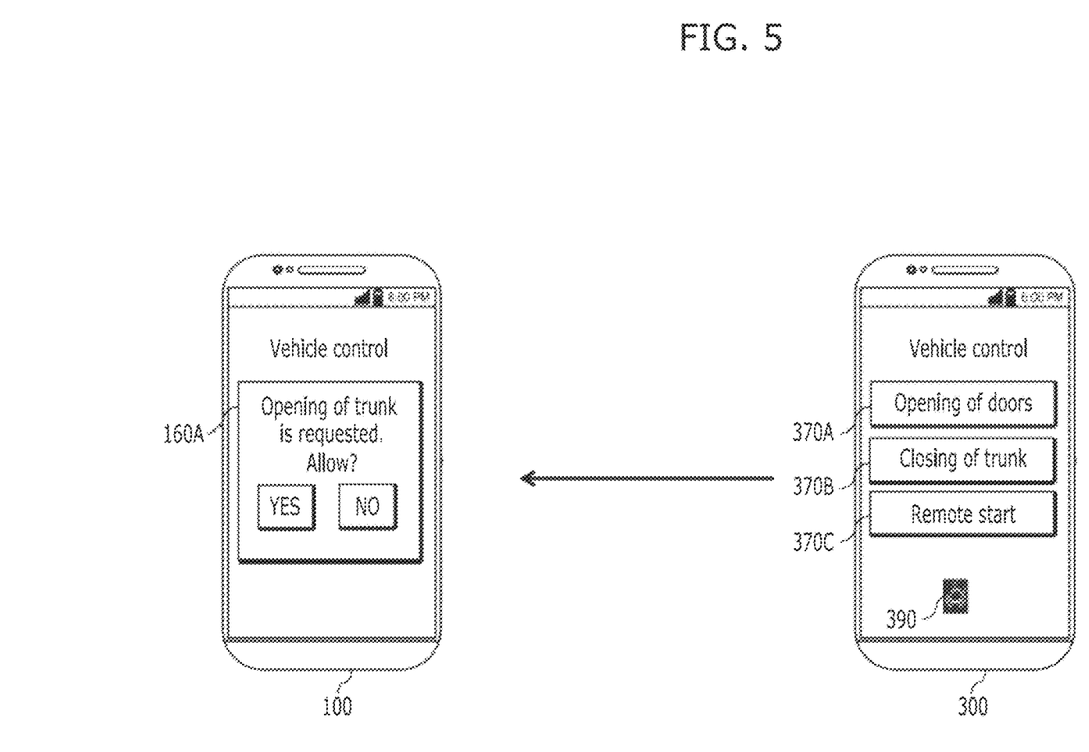
FIG. 5 illustrates a procedure of granting permission to control a vehicle according to embodiments of the present disclosure.

FIG. 5 illustrates a procedure of granting permission to control a vehicle according to embodiments of the present disclosure.

First, a service-providing device 300 may request that a permission-granting device 100 perform vehicle control corresponding to a specific service. For example, the service-providing device 300 may transmits a trunk opening command 370B.

If the permission-granting device 100 permits opening of a trunk, the trunk of a vehicle may be opened.

A vehicle control range 390 may be displayed on a user interface of the service-providing device 300.

Figure 6:
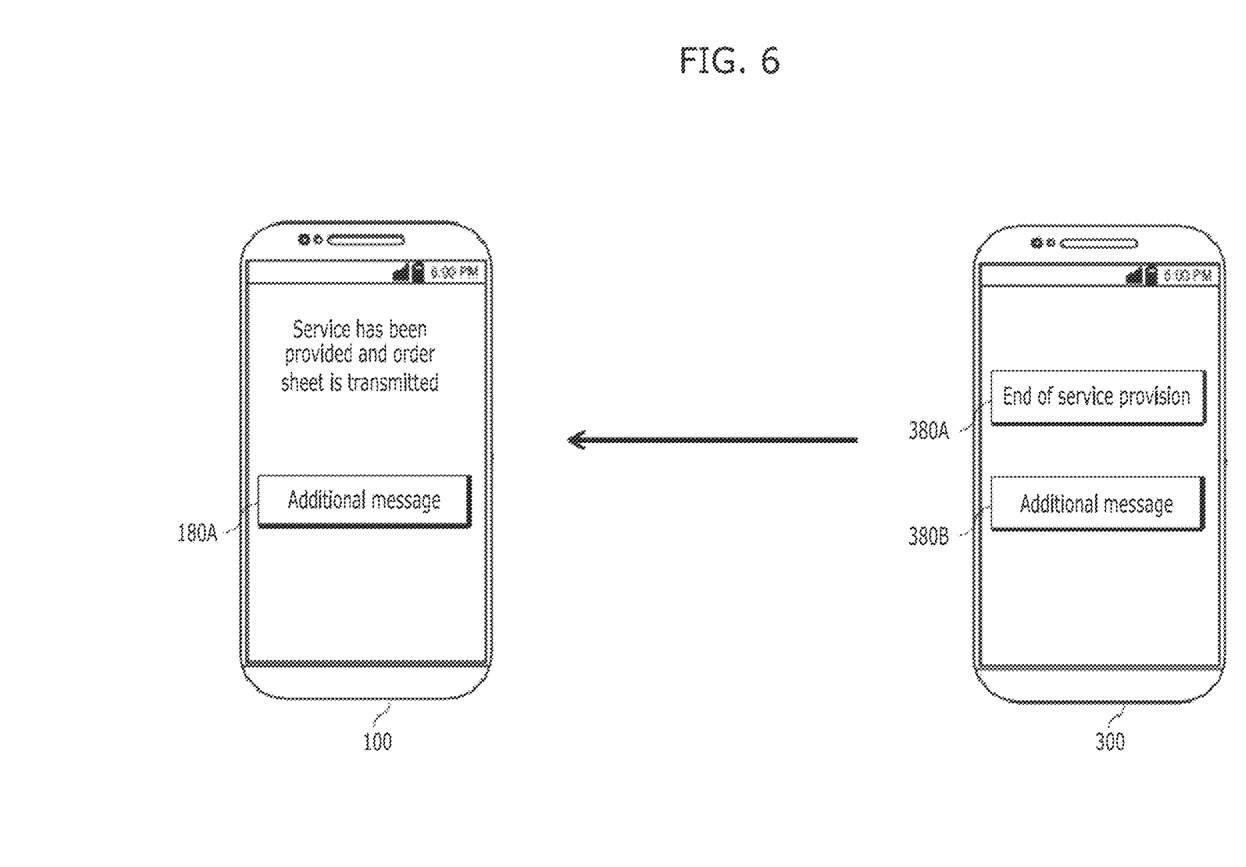
FIG. 6 illustrates the state in which a vehicle related service has been provided according to embodiments of the present disclosure.

FIG. 6 illustrates the state in which a vehicle related service has been provided according to embodiments of the present disclosure.

First, if provision of a specific service is ended, the service-providing device 300 may provide a message 380A indicating that end of service provision and an additional message 380A to a permission-granting device 100.

Then the permission-granting device 100 may receive the message indicating end of service provision and an order sheet for a service charge. The permission-granting device 100 may also display an additional message 180A received from the service-providing device 300.

Figure 7:
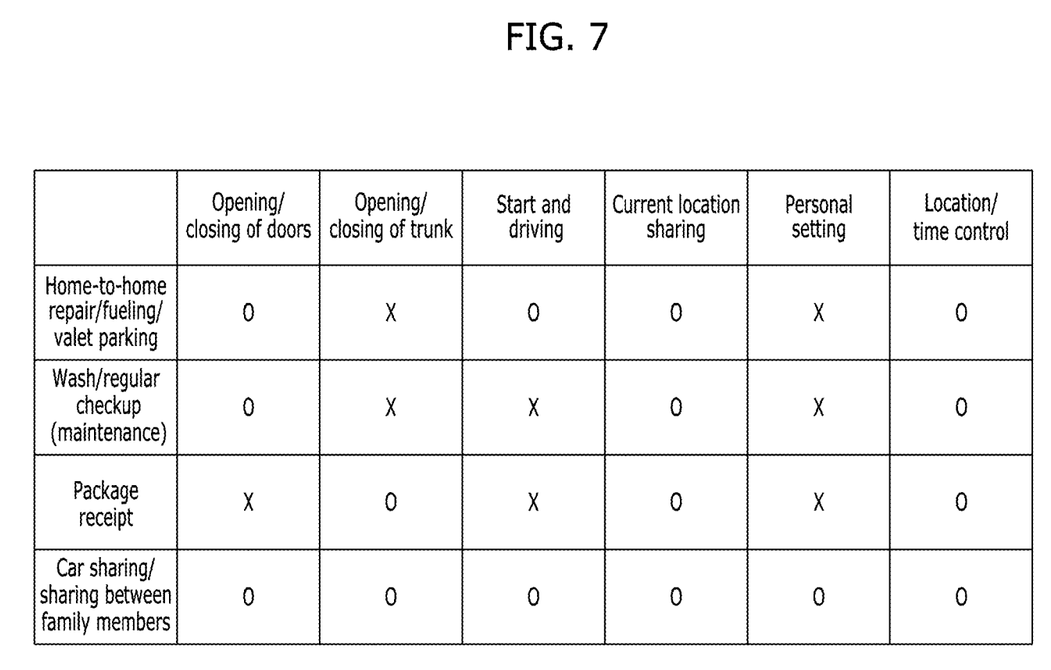
FIG. 7 is a table illustrating a vehicle control range corresponding to a service type related to a vehicle according to embodiments of the present disclosure.

FIG. 7 illustrates a vehicle control range corresponding to a service type related to a vehicle according to embodiments of the present disclosure.

In the case of a home-to-home repair, fueling, designated driving, valet parking service, or the like, the permission-granting device 100 may grant permission to perform various operations, such as open and close vehicle doors, start a vehicle, share a current location of the vehicle, and perform location/time control to the service-providing device 300.

In the case of a car wash or regular checkup (i.e., maintenance) service, the permission-granting device 100 may grant permission to open and close vehicle doors, share a current location of a vehicle, and perform location/time control to the service-providing device 300.

In addition, in the case of a package receipt service, the permission-granting device 100 may grant permission to open and close a vehicle trunk, share a current location, and perform location/time control to the service-providing device 300.

In the case of a car sharing or a sharing service between family members, the permission-granting device 100 may grant permission to, for example, open/close vehicle doors, open/close a vehicle trunk, start and drive a vehicle, share a current location, perform personal setting, or perform location/time control to the service-providing device 300.

Figure 8:
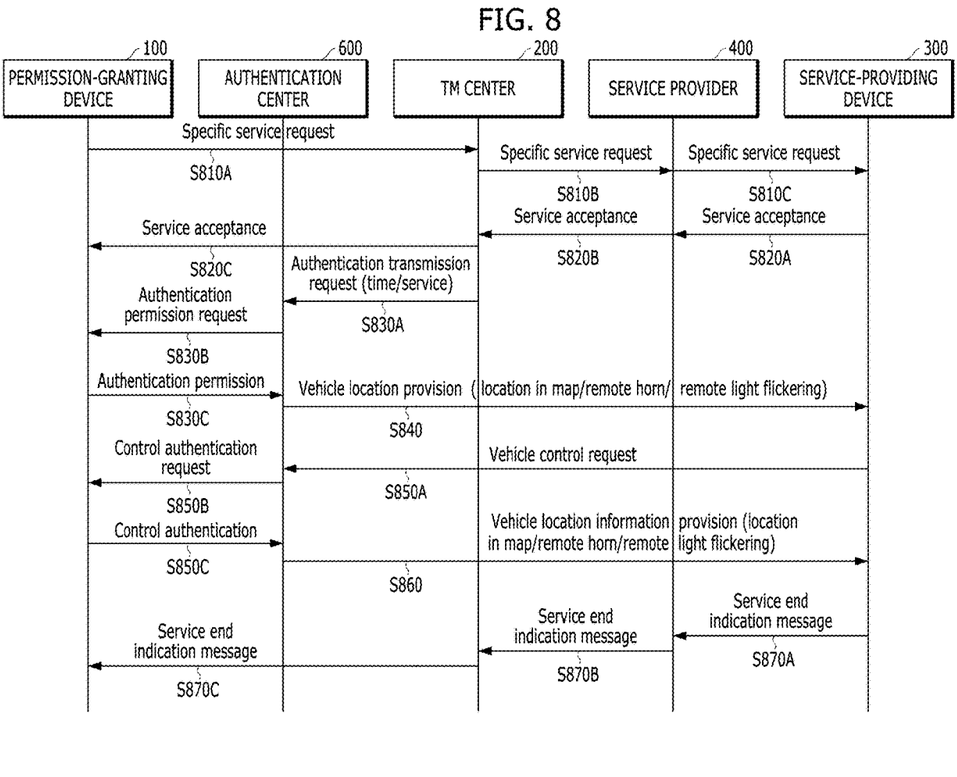
FIG. 8 illustrates a sequence of driving a service system according to embodiments of the present disclosure.

FIG. 8 illustrates a sequence of driving a service system according to embodiments of the present disclosure.

The permission-granting device 100 requests that a TM center 200 provide a specific service (S810A).

The TM center 200 searches for the service provider 400 to request that the service provider 400 provide the specific service (S810B). The service provider 400 requests that the service-providing device 300 provide the specific service (S810C).

The service-providing device 300, the service provider 400, and the TM center 200 sequentially accept the service request (S820A, S820B, and S820C).

In this case, the service provider 400 may provide information about time at which a service can be provided and information about a person who is to provide a service to the TM center 200.

Next, the TM center 200 requests that the authentication center 600 transmit authentication for a time/service (S830A). The authentication center 600 performs an authentication procedure with the permission-granting device 100 (S830B and S830C). The permission-granting device 100 may transmit information about a requested service type and a requested service provision time.

The authentication center 600 may provide information about the location of a vehicle to the service-providing device 300. The information about the location of the vehicle may include information about the location of the vehicle in a map, information about remote control of the horn of the vehicle, and information about remote control of light flickering of the vehicle. The service-providing device 300 may display information about a controllable range in the vehicle on a display (not shown).

If a service has been provided, the service-providing device 300, the service provider 400, and the TM center 200 sequentially transmit a message indicating that the service has been provided (S870A, S870B, and S870C).

According to embodiments of the present disclosure, since a vehicle related service is safely provided without exchanging a vehicle key, user convenience and service efficiency can be improved. In addition, since a user simply makes a request for the vehicle related service online and receives the service, user convenience can be improved.

Those skilled in the art will appreciate that the present disclosure may be embodied in other specific forms than those set forth herein without departing from the spirit and essential characteristics of the present disclosure. The above detailed description is therefore to be construed in all aspects as illustrative and not restrictive. The scope of the disclosure should be determined by reasonable interpretation of the appended claims and all changes coming within the equivalency range of the disclosed embodiments are within the scope of the disclosure.

The method according to the above-described embodiments may be implemented as a computer-executable program that can be recorded in a computer-readable medium. Examples of the computer-readable medium include a Read Only Memory (ROM), a Random Access Memory (RAM), a Compact Disc (CD)-ROM, a magnetic tape, a floppy disk, an optical data storage, and the like. The computer-readable recording medium can be distributed over a computer system connected to a network so that computer-readable code is written thereto and executed therefrom in a decentralized manner. Functional programs, code, and code segments needed to realize the above-described method can be easily derived by programmers skilled in the art.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A device for granting permission to control a vehicle, the device comprising:
   a communication unit; and
   a controller transmitting a request through the communication unit to a telematics (TM) center to provide a specific service related to the vehicle and sharing information about a location of the vehicle with a specific service provider that provides the specific service, wherein
   upon receiving a request for permission to control the vehicle from a specific-service providing device, the controller grants permission to control the vehicle to the specific service-providing device in exchange for providing the specific service,
   the specific service-providing device directly controls the vehicle when the specific service is within a granted permission range, and
   the controller directly controls the vehicle when the specific service is outside of the granted permission range.

2. The device according to claim 1, wherein the controller grants permission to control the vehicle to the specific-service providing device through an authentication center when the authentication center receives the request for permission to control the vehicle from the specific-service providing device and approves authentication for the specific-service providing device.

3. The device according to claim 1, wherein the controller receives information about at least one service provider from the TM center and selects the specific service provider from among the at least one service provider.

4. The device according to claim 1, wherein the controller is requested to grant permission to control the vehicle through a device used by the specific service provider.

5. The device according to claim 1, wherein the specific service includes at least one of a vehicle repair service, a parking service, a fueling service, a washing service, a vehicle checkup service, a package receipt service, and a car sharing service.

6. The device according to claim 1, wherein the controller remotely activates a horn of the vehicle or lights of the vehicle upon receiving a request to search for the vehicle from the specific service provider.

7. A method of controlling a device for granting permission to control a vehicle, the method comprising:
   transmitting, by a controller, a request through a communication unit to a telematics (TM) center to provide a specific service related to the vehicle;
   sharing, by the controller, information about a location of the vehicle with a specific service provider that provides the specific service;
   upon receiving a request for permission to control the vehicle from a specific-service providing device, granting, by the controller, permission to control the vehicle to the specific-service providing device in exchange for providing the specific service; and
   directly controlling, by the controller, the vehicle when the specific service is outside of a granted permission range,
   wherein the specific service-providing device directly controls the vehicle when the specific service is within the granted permission range.

8. The method according to claim 7, further comprising:
   receiving, by the controller, information about at least one service provider from the TM center; and
   selecting, by the controller, the specific service provider from among the at least one service provider.

9. The method according to claim 7, wherein the granting of permission to control the vehicle comprises:
   receiving, by the controller, a request for permission to control the vehicle through a device used by the specific service provider.

10. The method according to claim 9, wherein the granting of permission to control the vehicle comprises:
    granting, by the controller, the permission to control the vehicle to the specific service-providing device when an authentication center receives the request for permission to control the vehicle from the specific service-providing device and approves authentication for the specific service-providing device.

11. The method according to claim 7, wherein the specific service includes at least one of a vehicle repair service, a parking service, a fueling service, a washing service, a vehicle checkup service, a package receipt service, and a car sharing service.

12. The method according to claim 7, further comprising:
    remotely activating, by the controller, a horn of the vehicle or lights of the vehicle upon receiving a request to search for the vehicle from the specific service provider.

13. A service-providing device comprising:
    a device communication unit; and
    a device controller receiving a request through the device communication unit from a permission-granting device to provide a specific service related to a vehicle and providing the specific service to the vehicle in response to the received request, wherein
    the device controller receives information about a location of the vehicle through the device communication unit from the permission-granting device,
    the device controller transmits a request to the permission-granting device to grant permission to control the vehicle in exchange for providing the specific service,
    upon receiving the permission to control the vehicle from the permission-granting device, the device controller directly controls the vehicle when the specific service is within a granted permission range, and
    the permission-granting device directly controls the vehicle when the specific service is outside of the granted permission range.

14. The service-providing device according to claim 13, wherein the device controller activates a horn of the vehicle or lights of the vehicle to search for the vehicle.

15. The service-providing device according to claim 13, wherein the device controller transmits a service end indication message to a telematics (TM) center when provision of the specific service ends.

16. The service-providing device according to claim 13, further comprising:
    a display,
    wherein the device controller controls the display to display the granted permission range.

17. A control system installed in a vehicle, the control system comprising:
    a vehicle communication module communicating with at least one of a telematics (TM) center, a permission-granting device, a service-providing device, and an authentication center; and a vehicle controller performing control such that, upon input of a vehicle control command from the authentication center, an operation corresponding to the vehicle control command is performed for performing a specific service related to the vehicle, wherein the service-providing device directly controls the vehicle when the specific service is within a granted permission range, and the permission-granting device directly controls the vehicle when the specific service is outside of the granted permission range.

18. The control system according to claim 17, wherein the vehicle controller activates a horn of the vehicle or lights of the vehicle upon receiving a corresponding command from the authentication center to search for the vehicle.

* * * * *